Feb. 26, 1957 P. R. HERVEY 2,782,585
TRACTOR MOUNTED ROTARY DISC TYPE MOWING ASSEMBLY
Filed March 25, 1954 5 Sheets-Sheet 2
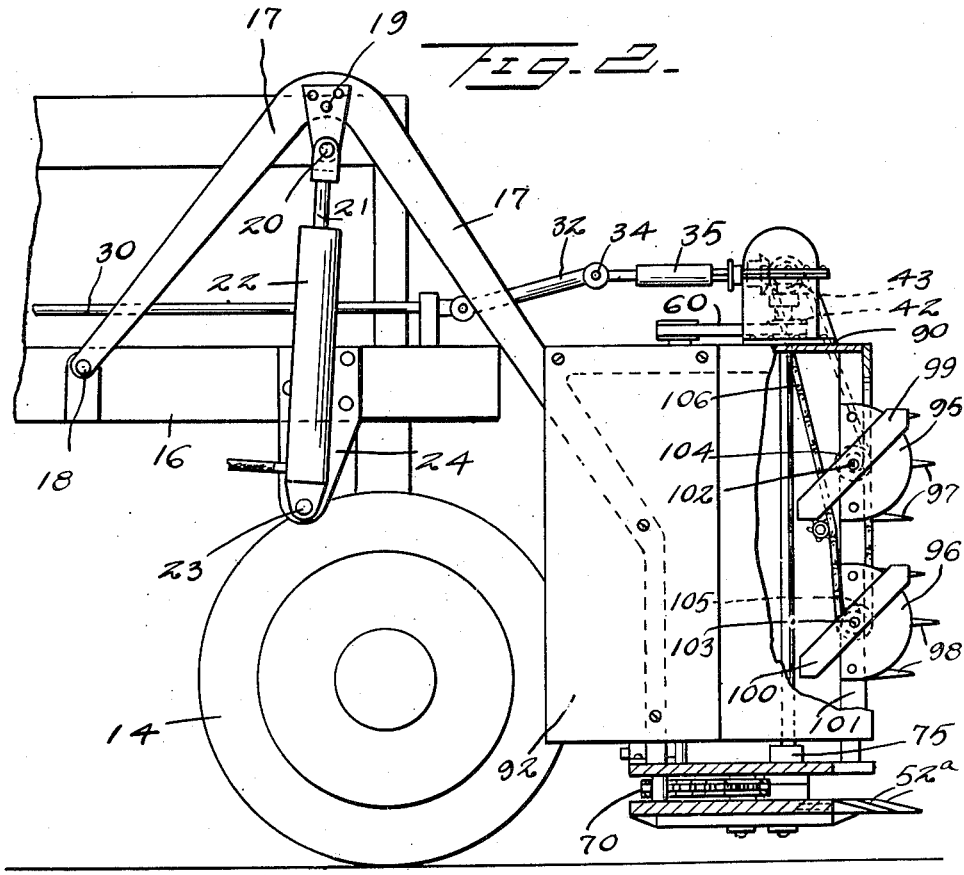
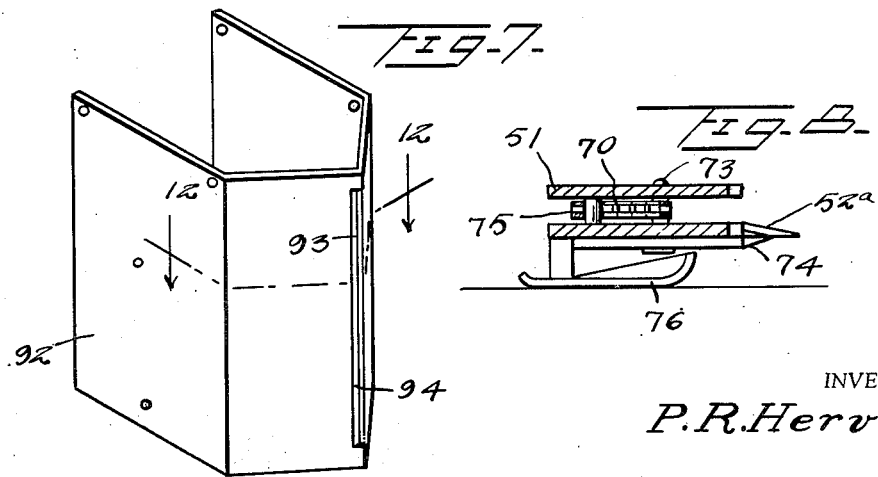
INVENTOR
P. R. Hervey
BY Kimmel & Crowell
ATTORNEYS Feb. 26, 1957 P. R. HERVEY 2,782,585
TRACTOR MOUNTED ROTARY DISC TYPE MOWING ASSEMBLY
Filed March 25, 1954 5 Sheets-Sheet 3
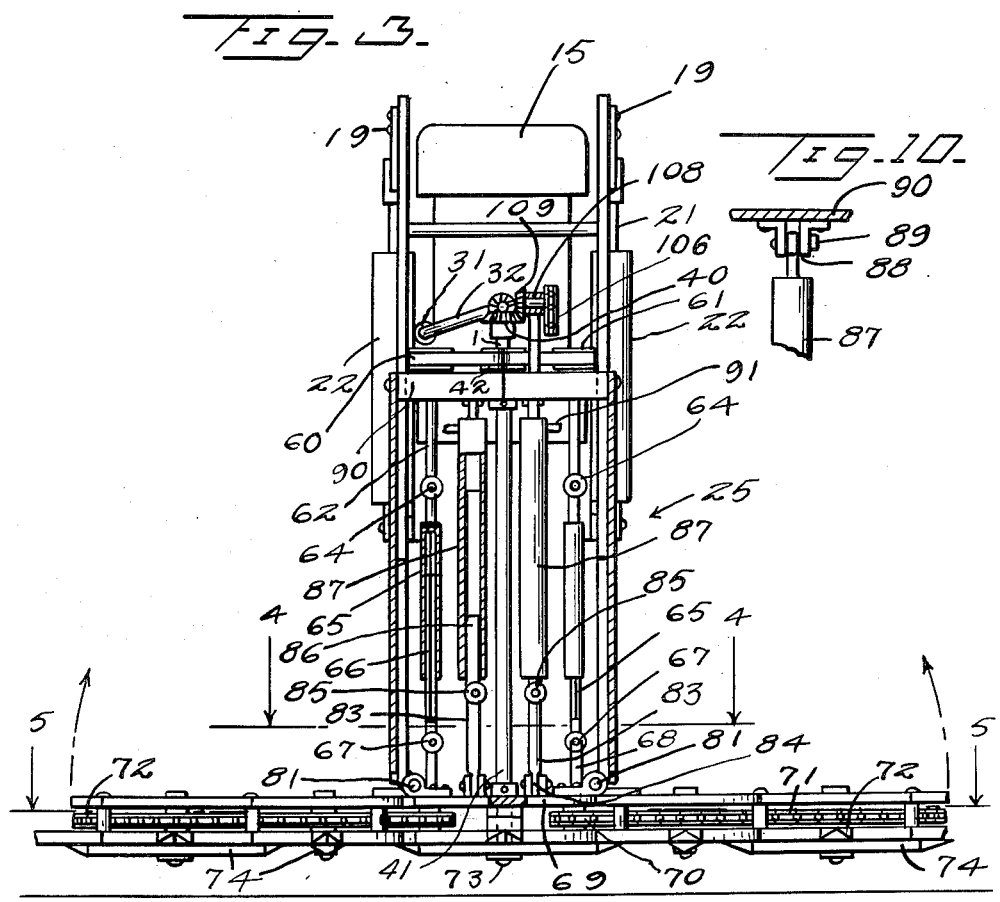
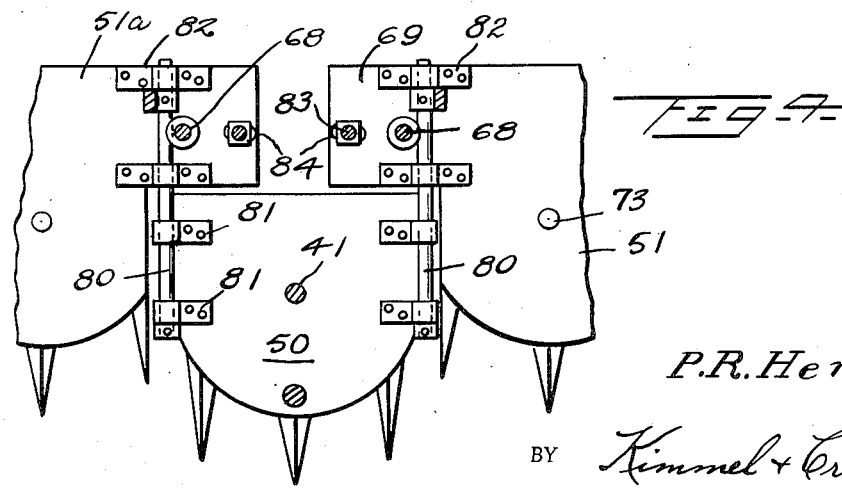
INVENTOR
P. R. Hervey
BY Kimmel & Crowell
ATTORNEYS

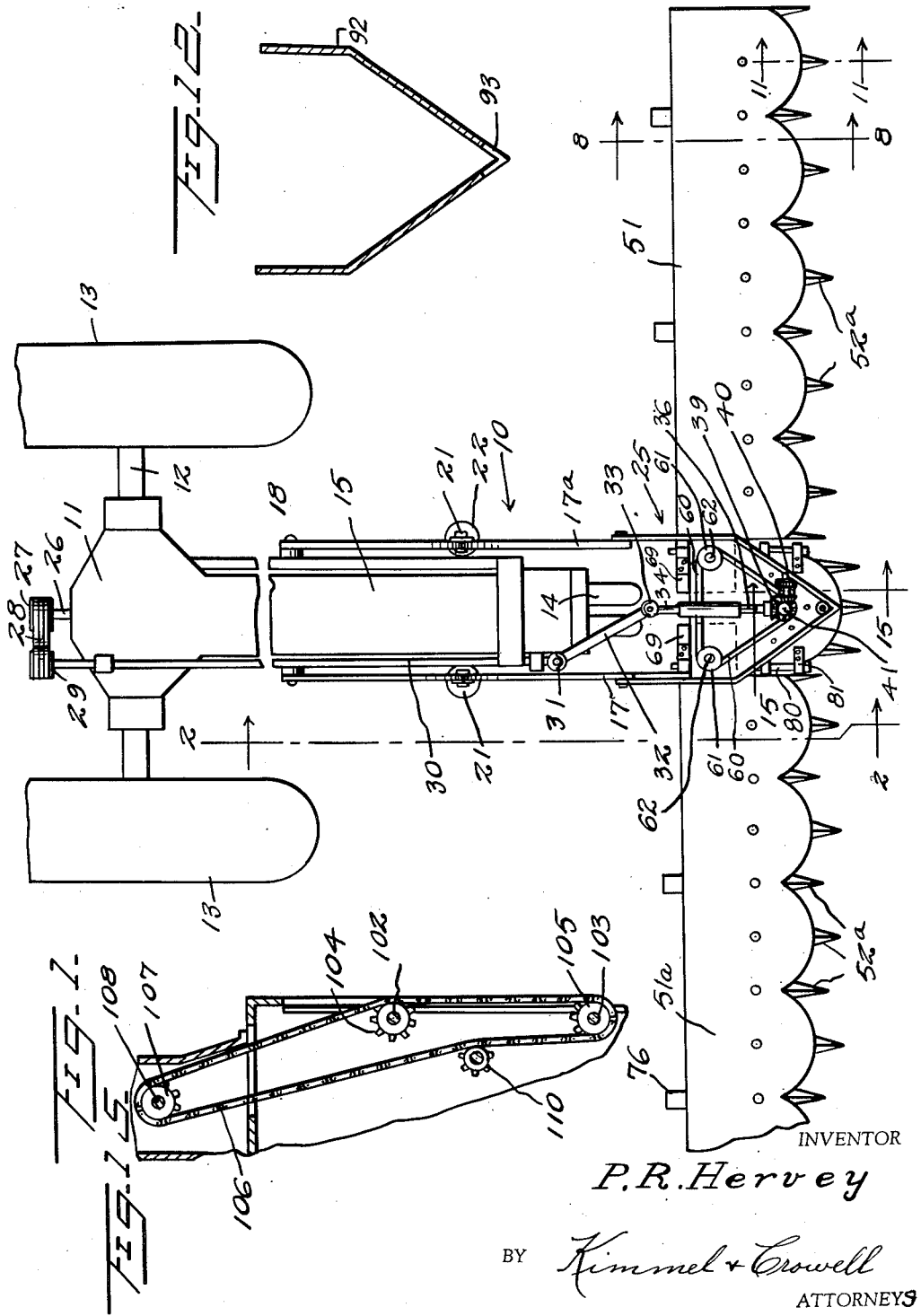

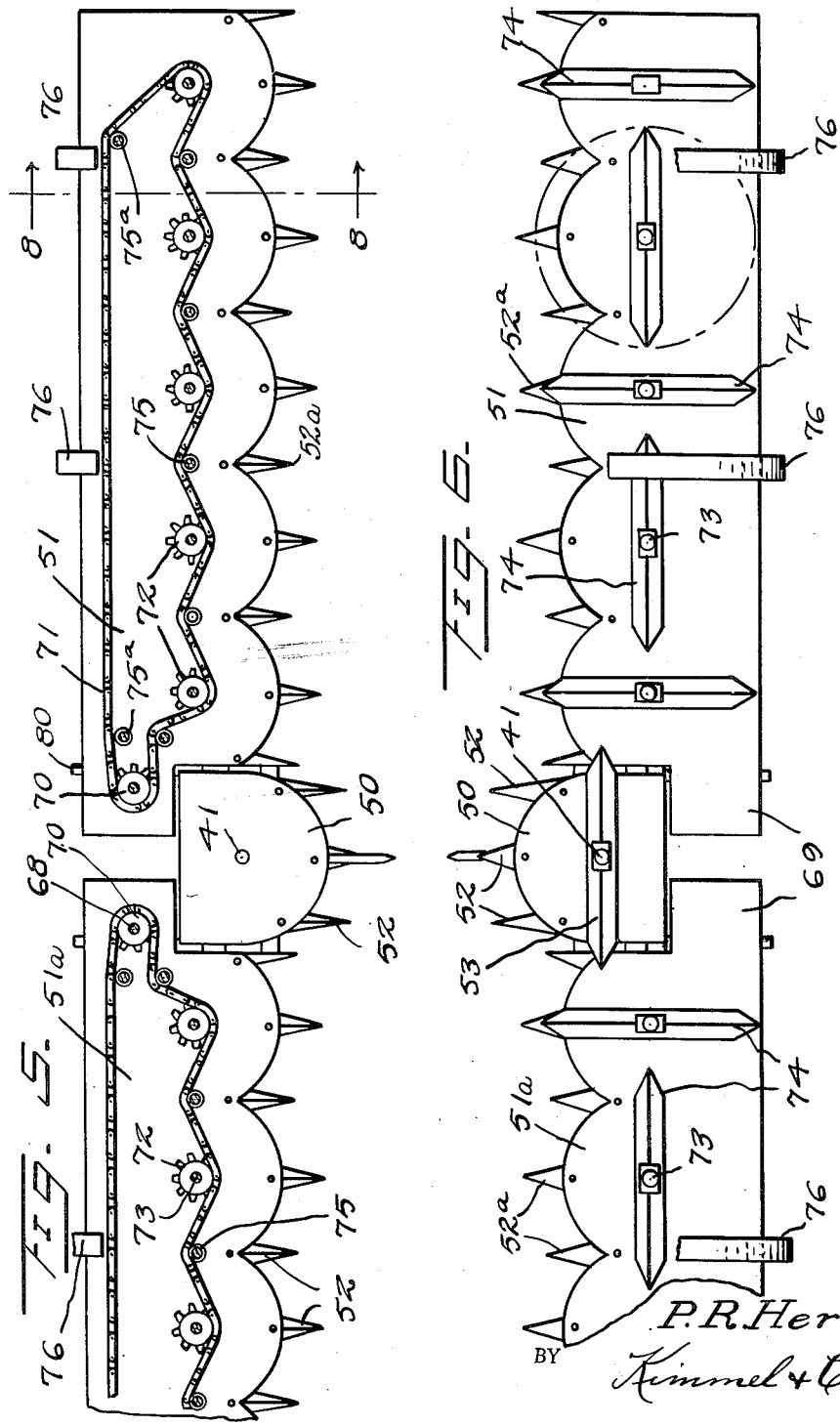

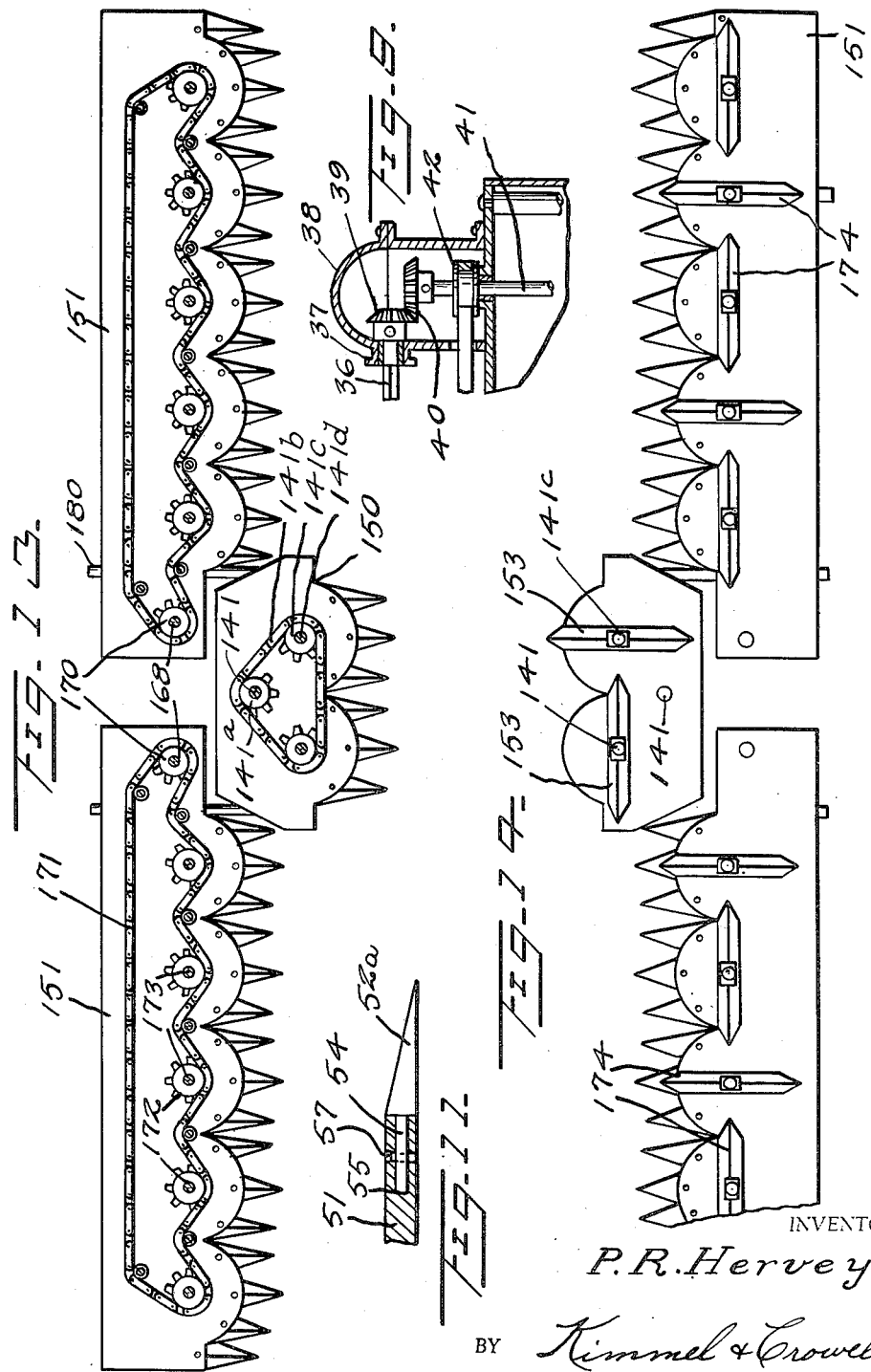

United States Patent Office 2,782,585
Patented Feb. 26, 1957

2,782,585

TRACTOR MOUNTED ROTARY DISC TYPE MOWING ASSEMBLY

Paul Reo Hervey, El Paso, Tex.

Application March 25, 1954, Serial No. 418,615

3 Claims. (Cl. 56—25.4)

This invention relates to a mowing machine, and more particularly to such a device for cutting hay, tall grass, grain, or similar material.

A primary object of this invention is the provision of a device of this nature which will serve to cut such material in an improved manner, and with relatively great rapidity and little effort.

A further object of the invention is the provision of a device provided with rotary cutting blades spaced to provide an overlapping cutting action insuring a clean cut, and eliminating spacing between plural rotary blades such as hitherto may have been used for similar cutting activities.

An additional object of the invention is the provision of such a mechanism which is adapted to be permanently mounted on a tractor or similar vehicle and propelled thereby to provide a relatively wide cutting swath.

Still another object of the invention is the provision of a mowing machine of the above character which may be readily elevated to raised position when it is desired to transport the same from place to place.

Still another object of the invention is the provision of such a device provided with a center cutting section, and further with right and left cutting sections, either or both of which latter may be pivotally swung in a vertical plane about a hinge pin associated with said center section.

Still another object of the invention is the provision of mechanism which may be readily controlled by the driver of the propelling vehicle from a point remote from the mowing mechanism.

Still other objects reside in the combinations of elements, arrangements of parts, and features of construction, all as will be more fully pointed out hereinafter, and disclosed in the accompanying drawings wherein there are shown preferred embodiments of this inventive concept.

In the drawings:

Figure 1 is a top plan view of one form of mowing machine embodying features of the instant invention shown as attached to a tractor or the like, certain portions thereof including the vertical cutters being removed for the sake of clarity, and certain other portions being broken away.

Figure 2 is an enlarged sectional view taken substantially along the line 2—2 of Figure 1, as viewed in the direction indicated by the arrows.

Figure 3 is a front elevational view of the construction of the device of Figures 1 and 2, certain parts thereof being shown in section.

Figure 4 is a sectional view taken substantially along the line 4—4 of Figure 3 as viewed in the direction indicated by the arrows with parts broken away.

Figure 5 is a sectional view taken substantially along the line 5—5 of Figure 3 as viewed in the direction indicated by the arrows with parts broken away.

Figure 6 is a bottom plan view of that portion of the mechanism disclosed in Figure 5 with parts broken away.

Figure 7 is a perspective view of the shielding element of the mechanism.

Figure 8 is a sectional view taken substantially along the line 8—8 of Figures 1 and 5, as viewed in the direction indicated by the arrows.

Figure 9 is an enlarged fragmentary detail view, partially in section, of portions of the gear mechanism disclosed in Figure 2, and viewed from the same direction.

Figure 10 is an enlarged detailed view of the hydraulic cylinder attachment, partially in section.

Figure 11 is an enlarged sectional view taken substantially along the line 11—11 of Figure 1, as viewed in the direction indicated by the arrows with parts broken away.

Figure 12 is an enlarged sectional view taken substantially along the line 12—12 of Figure 7, as viewed in the direction indicated by the arrows.

Figure 13 is a view similar to Figure 5, but disclosing a modified form of construction.

Figure 14 is a view similar to Figure 6, but disclosing the reverse side of the construction of Figure 13.

Figure 15 is a fragmentary vertical section of the central vertical cutter operating means.

Similar reference characters refer to similar parts throughout the several views of the drawings.

Referring now to the drawings in detail, and more particularly to Figure 1, there is generally indicated at 10 a tractor or similar device, including a transmission 11 driving a rear axle 12, and power wheels 13. Front steering wheels 14 are also provided, and the tractor includes the customary motor 15 and longitudinally extending frame members 16.

The opposite frame members 16 are provided with brackets 17 of inverted V-shaped configuration, and pivotally connected as by pivots 18 to the frame members 16. The inverted apex of each V-shaped member 17 is engaged by a clamping bracket 19 pivotally connected as by a pivot 20 to the operating rod 21 of a hydraulic cylinder 22, which latter is in turn pivotally connected as by a pivot 23 to a depending bracket 24 carried by the tractor frame 16.

The opposite leg 17a of each V-shaped member extends forwardly and is connected to the mowing machine proper, the latter being generally indicated at 25. Hydraulic cylinders 22 may be controlled in any desired conventional manner from a remote location by the operator of the tractor.

Tractor 10 is provided with a conventional power take off shaft 26, which drives a pulley 27, which in turn, through a belt 28, drives a second pulley 29 which serves to rotate a mower driving shaft 30, shaft 30 extends to a universal joint 31 which is connected by a link 32 to a second universal joint 33, which in turn has a projection 34 extending into a socket 35 comprising a portion of the drive shaft 36 of the mowing machine.

As best shown in Figure 9, the drive shaft 36 extends through a bushing 37 in a gear box housing 38, and terminates in a beveled gear 39 which in turn drives a beveled gear 40 connected to a vertical shaft 41, the latter being provided with a pulley 42.

The mower table per se consists of a central section 50 and oppositely disposed right section 51a and left section 51, the two sections 51 and 51a being substantially identical in configuration but oppositely arranged. The drive shaft 41 extends vertically through center section 50, which is in the form of a semi-oval having a forwardly convexed portion provided with a plurality of cutter guide teeth 52. Mounted on the under side of center section 50 and affixed directly to shaft 41 is a rotatable cutting blade 53.

The cutter guide teeth 52a are, as best shown in Figure 11, of triangular cross-section, and include flange portions 54 secured in suitable slots 55 in the edge of the section 51 as by means of bolts or rivets 57.

As best shown in Figures 1, 2, and 3, pulley 42 drives a belt 60, which extends about opposed pulleys 61, each of which is connected to a drive shaft 62 which extends downwardly to a universal joint 64. Each universal joint 64 is connected to a cylinder or piston 65 on which is slidably mounted a rod 66, which extends to an additional universal joint 67.

From each of joints 67 a drive shaft 68 extends downwardly through a tang 69 provided at the inner extremity of each of side sections 51 and 51a, and terminates in a sprocket 70. Each sprocket 70 is adapted, as best shown in Figure 5, to drive a chain 71, which extends about a plurality of additional sprockets 72 extending in transverse alignment substantially the full length of each of sections 51 and 51a.

Each sprocket 72 is mounted on a spindle or shaft 73 which extends through a suitable aperture in the associated table, and has affixed thereto a cutting blade 74, all of the blades 74 being rotated in unison through the drive shafts 68, which are in turn, as previously described, driven by the power take off of the tractor.

Each of sections 51 and 51a is provided with cutter guides 52a substantially identical in construction to the previously described cutter guides 52, and alternate blades 74 are positioned at right angles to each other. Guide rollers 75 are positioned between the sprockets 73 at equally distant spaced intervals to tension the chain 71, and opposite spindles 75a are also provided on opposite sides of the chain.

Each of the sections 51 and 51a is provided at suitably spaced intervals with skids 76 for supporting the cutters at a proper distance above the ground when the tables are in their lower position.

Each of the sections 51 and 51a is hingedly connected to center table section 50, and the hinge connections are, as best shown in Figure 4, comprised of elongated pins 80 which engage in bearings or brackets 81 carried by center section 50 and corresponding brackets 82 carried by the tangs 69 of end sections 51 and 51a outwardly of the drive shafts 68.

As best shown in Figure 3, rods 83 are pivotally connected as by pivots 84 to the inner extremities of tangs 69, and extend through universal joints 85 to rod sections 86 which are contained in hydraulic cylinders 87, the cylinders 87 being connected at their upper extremities as by means of brackets 88 in a pivotal connection 89 to a plate 90 secured adjacent the top of the shield 92.

By virtue of this arrangement it will be seen that either of mower sections 51 and 51a may be tilted angularly relative to the center section 50, hydraulic fluid being supplied to the cylinders 87 through connections 91 from any desired source in the body of the tractor or the like.

A V-shaped shield 92 is disposed in covering position to the central operating means, and is formed with slots 93 and 94 through which project stationary plates 95 and 96, respectively. Plates 95 and 96 have stationary cutters 97 and 98, respectively, and rotary cutters 99 and 100 are associated with cutters 97 and 98, respectively. Plates 95 and 96 are fixed to a vertical supporting bar 101 and shafts 102 and 103 are journalled through bar 101. A sprocket 104 is fixed on shaft 102 and a sprocket 105 is fixed on shaft 103. A chain 106 engages about sprockets 104 and 105 and also engages about a driving sprocket 107 secured to a shaft 108. Shaft 108 is journalled in gear housing 38, and has a bevelled gear 109 fixed thereon which meshes with gear 40. An idler sprocket 110 engages the rear run of chain 106 for maintaining chain 106 substantially taut.

Figures 13 and 14 disclose a slightly modified form of construction, wherein center sections 150 and side sections 151 are provided, Figures 13 and 14 corresponding respectively to Figures 5 and 6 of the previous modification.

Sprockets 170 are connected to drive shafts 168, the latter being driven in the same manner as the previously described drive shafts 68, while main drive shaft 141 has connected to its lower extremity a sprocket 141a, which drives a chain 141b, which in turn drive through sprockets 141c additional shafts 141d, the latter each serving to drive a blade 153 carried by the center section.

The sprockets 170 in turn drive chains 171, which through sprockets 172 drive shafts 173 which serve to rotate blades 174. The sections are connected by hinge pins 180 in a manner substantially identical to that described in connection with the previously mentioned hinge pins 80.

It is to be noted that in both of these modifications, as previously mentioned, all of the blades are disposed at right angles to each other and the length of each blade is such that in the rotative movement thereof the adjacent blades cut overlapping swathes in such manner that there is no uncut hay, or the like, left after the machine has passed over the ground.

From the foregoing, it will now be seen that there is herein provided an improved mowing device which provides for an extremely clean cut swath, which may be readily adjusted to meet a variety of terrain conditions, which may be simply and expeditiously mounted on a tractor, and which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a mowing machine attachment for the front end of a tractor or the like, a supporting frame, a cutting device carried by said frame at the lower extremity thereof, said cutting device including a center section and opposite side sections pivotally secured thereto, rotatable cutting blades on the under side of each section, common means for rotating all of said blades simultaneously, said means including a vertical drive shaft for each section, chain and sprocket connection from each shaft to each blade of its associated section, vertically arranged cutter means carried by said center section, a drive shaft for said last named cutter means, common means for driving all of said shafts from the power take off of the tractor, each blade comprising a pair of aligned cutting edges and each blade being set at right angles to its associated blade to provide an overlapping cut, and hydraulic means carried by said frame for selectively pivoting either or both of said side sections.

2. In a mowing machine attachment for the front end of a tractor or the like, a supporting frame, a cutting device carried by said frame at the lower extremity thereof, said cutting device including a center section and opposite side sections pivotally secured thereto, rotatable cutting blades on the under side of each section, common means for rotating all of said blades simultaneously, said means including a vertical drive shaft for each section, chain and sprocket connection from each shaft to each blade of its associated section, vertically arranged cutters carried by said center section, a drive shaft for said last named cutters, common means for driving all of said shafts from the power take off of the tractor, each blade comprising a pair of aligned cutting edges and each blade being set at right angles to its associated blade to provide an overlapping cut, hydraulic means carried by said frame for selectively pivoting either or both of said side sections, and separate hydraulic means for raising said frame in its entirety.

3. In a mowing machine attachment for the front end of a tractor or the like, a supporting frame, a cutting device carried by said frame at the lower extremity thereof, said cutting device including a center section and opposite side sections pivotally secured thereto, rotatable cutting blades on the under side of each section, common means for rotating all of said blades simultaneously, said means including a vertical drive shaft for each section, chain and sprocket connection from each shaft to each blade of its associated section, vertically arranged cutter means carried by said center section, a drive shaft for said last named cutter means, common means for driving all of said shafts from the power take off of the tractor, each blade comprising a pair of aligned cutting edges and each blade being set at right angles to its associated blade to provide an overlapping cut, and hydraulic means carried by said frame for selectively pivoting either or both of said side sections, said hydraulic means including universally mounted cylinder and piston members carried vertically by said frame.

References Cited in the file of this patent
UNITED STATES PATENTS

| | | |
|---|---|---|
| 914,492 | Johnston | Mar. 9, 1909 |
| 2,603,052 | Pelham | July 15, 1952 |
| 2,682,740 | Miller et al. | July 6, 1954 |